(12) United States Patent
Broderick

(10) Patent No.: US 11,713,368 B2
(45) Date of Patent: Aug. 1, 2023

(54) FORMULATED WATERBORNE POLYURETHANE DISPERSION COMPOSITION FOR STABLE AMBIENT-DRIED FOAMS

(71) Applicant: DDP SPECIALTY ELECTRONIC MATERIALS US, INC., Collegeville, PA (US)

(72) Inventor: Adam Howlett Broderick, Midland, MI (US)

(73) Assignee: DDP SPECIALTY ELECTRONIC MATERIALS US, LLC., Wilmington, DE (US)

( * ) Notice: Subject to any disclaimer, the term of this patent is extended or adjusted under 35 U.S.C. 154(b) by 690 days.

(21) Appl. No.: 16/695,890

(22) Filed: Nov. 26, 2019

(65) Prior Publication Data

US 2020/0172654 A1    Jun. 4, 2020

Related U.S. Application Data

(60) Provisional application No. 62/773,369, filed on Nov. 30, 2018.

(51) Int. Cl.
| | |
|---|---|
| *C08G 18/48* | (2006.01) |
| *C08G 18/40* | (2006.01) |
| *C08G 18/75* | (2006.01) |
| *C08J 9/14* | (2006.01) |
| *C08G 18/44* | (2006.01) |

(52) U.S. Cl.
CPC ......... *C08G 18/48* (2013.01); *C08G 18/4018* (2013.01); *C08G 18/44* (2013.01); *C08G 18/755* (2013.01); *C08G 2110/005* (2021.01); *C08G 2110/0008* (2021.01); *C08G 2110/0058* (2021.01); *C08G 2110/0066* (2021.01); *C08J 9/149* (2013.01); *C08J 2207/04* (2013.01)

(58) Field of Classification Search
CPC ...... C08J 9/28; C08G 18/755; C08G 18/4018; C09D 175/04–08; C09K 3/30
See application file for complete search history.

(56) References Cited

U.S. PATENT DOCUMENTS

| | | |
|---|---|---|
| 4,374,935 A | 2/1983 | Decker et al. |
| 5,554,686 A | 9/1996 | Frisch, Jr. et al. |
| 6,333,365 B1 | 12/2001 | Lucas et al. |

(Continued)

*Primary Examiner* — Stephen E Rieth

(57) ABSTRACT

Foamable waterborne dispersions which form stable flexible foams under ambient cure conditions are disclosed, said foamable waterborne dispersions comprising: a polyurethane polymer formed from one or more aliphatic or cycloaliphatic polyisocyanate and at least two different polymeric polyol components selected from polyether polyol, polyester polyol, and polycarbonate polyol; wherein the ambient cure conditions include a temperature of from 4° C. to 32° C., and a humidity of 0% relative humidity to 90% relative humidity. Also disclosed are the flexible foams produced from the foamable waterborne dispersions, as well as methods of providing a space filling layer or space filling volume adjacent to or on a surface, said methods comprising applying to said surface a foamed sample of the foamable waterborne dispersions, and allowing the foamed sample of foamable waterborne dispersion to dry under ambient conditions to yield a stable flexible foam.

7 Claims, 1 Drawing Sheet

(56) References Cited

U.S. PATENT DOCUMENTS

| | | |
|---|---|---|
| 6,340,715 B1 | 1/2002 | Sommer |
| 6,642,303 B2 | 11/2003 | Schutze et al. |
| 7,029,609 B2 | 4/2006 | Sommer |
| 7,179,845 B2 * | 2/2007 | Taylor ............... C08J 9/141 |
| | | 521/88 |
| 9,572,868 B2 | 2/2017 | Schonberger et al. |
| 2003/0032720 A1 * | 2/2003 | Haeberle ........... C08G 18/0866 |
| | | 524/589 |
| 2003/0094720 A1 * | 5/2003 | Sommer .............. C08J 9/00 |
| | | 521/97 |
| 2004/0109992 A1 * | 6/2004 | Gribble ............. B29C 44/569 |
| | | 428/315.9 |
| 2011/0275728 A1 | 11/2011 | Schonberger et al. |
| 2012/0263658 A1 | 10/2012 | Hofacker et al. |
| 2015/0259851 A1 | 9/2015 | Gu et al. |

\* cited by examiner

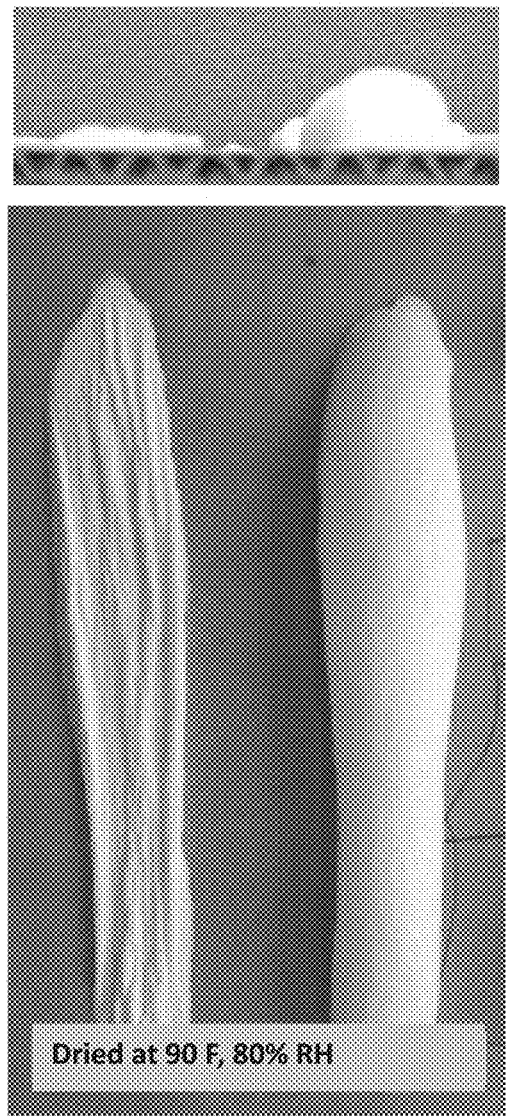

FORMULATED WATERBORNE POLYURETHANE DISPERSION COMPOSITION FOR STABLE AMBIENT-DRIED FOAMS

FIELD OF THE INVENTION

Described herein are formulated waterborne polyurethane dispersion compositions for stable ambient-dried foams, and methods of making same. More particularly, the foams are dispensed and dried under ambient conditions that may extend from temperatures of about 4° C. to about 32° C. (40 F to about 90 F) and across commonly encountered humidity ranges including high humidity conditions of 80% or even 90% relative humidity (RH) to yield dry flexible foams. In some embodiments, the foams may be dispensed from an aerosol can, and may also feature ease of application and easy clean up. Furthermore, methods of making and using these compositions are described herein. The compositions and methods disclosed herein can be utilized, for example, in the building and construction industry, for flexible space filling applications such as foamed sealants to block air transmission through gaps in the building envelope.

BACKGROUND OF THE INVENTION

Aerosol-dispensed waterborne latex foams have been well documented, and are currently produced and sold into the building and construction industry as an easy-cleanup foamed sealant to block air transmission through gaps in the building envelope. Products in this market must be able to dry at ambient conditions, which range in temperature and humidity based on geography and season. Particularly for indoor application, there is a clear preference for waterborne compositions in order to avoid the odor and environmental issues associated with the high volatile organic content (VOC) of solvent-borne compositions. However, latex aerosol foams are particularly sensitive to high relative humidity conditions (e.g. >80% RH) because the primary mechanism to lock the foam structure in place is the evaporation of water and polymer film formation. High humidity, combined with high temperature (e.g. >80 F) present the most challenging drying environment. Extended drying times often lead to flattening or collapse of applied foam, such as a bead of foam applied to a gap or building framing. In many intended applications, flattening of the bead, for example via foam collapse, results in reduced effectiveness for sealing gaps and increased loss of conditioned air from buildings.

Previous work on ambient-dried latex foams primarily addresses the problem of humidity-induced collapse of foam by designing additive blends comprising surfactants, soaps, waxes, and/or rheology modifiers to slow foam coarsening and collapse of the wet foam. See, for example, U.S. Pat. No. 7,029,609 B2 issued to H. Sommer. Such elements can be used effectively to produce foams from polyurethane dispersions (PUD) and/or acrylic latexes that are stable during drying at low relative humidity, but fail to sufficiently stabilize the bead against collapse during drying at high temperature and/or humidity.

A second approach described in the literature is the use of a higher volatility solvent (e.g. alcohols such as ethanol, isopropyl alcohol, etc) in place of some or all added water. (See, for example, U.S. Pat. No. 6,333,365 B1). This increases the rate of solvent evaporation, accelerating polymer film formation and locking of foam structure; however, foams produced using this approach either still exhibit humidity-induced bead flattening during drying, or have been observed to be extremely friable, thus lacking the toughness required to maintain a seal when exposed to physical manipulation or abuse.

Therefore, there is a need for a waterborne polyurethane composition that can be dispensed and dried under ambient conditions to yield a flexible foam, stable to collapsing even under hot and humid conditions (for example, 32° C. and 90% RH), while maintaining the foam toughness and integrity (for example, not friable) and resilience (for example, readily springs back after momentarily compressing the foam bead). The invention is directed to such compositions, the methods to prepare them, and methods for using them, as well as other, important ends.

SUMMARY OF THE INVENTION

In one embodiment, the invention provides a foamable waterborne dispersion which forms a stable flexible foam under ambient cure conditions, said foamable waterborne dispersion comprising, consisting of, or consisting essentially of: a polyurethane polymer formed from one or more aliphatic or cycloaliphatic polyisocyanate and at least two different polymeric polyol components selected from (i) polyether polyol, (ii) polyester polyol, and (iii) polycarbonate polyol; wherein the two different polymeric polyol components include a polymeric polyol from at least two of the three polymeric polyol categories (i), (ii) and (iii); and wherein the ambient cure conditions include a temperature of from 4° C. to 32° C., and a humidity of 0% relative humidity to 90% relative humidity.

In another embodiment, there is provided flexible foams produced from the foamable waterborne dispersions of the invention.

In a further embodiment, there is provided methods of providing a space filling layer or space filling volume adjacent to or on a surface, said methods comprising, consisting of, or consisting essentially of: (a) applying to said surface a foamed sample of the foamable waterborne dispersion of the invention; and (b) allowing the foamed sample of foamable waterborne dispersion to dry under ambient conditions to yield a stable flexible foam; wherein the ambient cure conditions include a temperature of from 4° C. to 32° C., and a humidity of 0% relative humidity to 90% relative humidity. In some embodiments, the step of applying the foamed sample of the foamable waterborne dispersion is performed by dispensing the foamable waterborne dispersion from a pressurized container, such as a pressurized aerosol container.

BRIEF DESCRIPTION OF THE DRAWINGS

The accompanying drawing, which is included to provide a further understanding of the invention and is incorporated in and constitutes a part of this specification, illustrates an embodiment of the invention and together with the description serves to explain the principles of the invention. In the drawing:

FIG. 1 shows waterborne polyurethane dispersion foams dried at 32° C. (90 F) and 80% relative humidity. The foam on the left is prepared from a commercial polyether polyol-based waterborne polyurethane dispersion; the foam on the right is prepared from a waterborne polyurethane dispersion based on a 50:50 blend of polyester polyol and polyether polyol. Both contain the same blend of additive components added to the respective PUDs.

DETAILED DESCRIPTION OF THE INVENTION

The present invention can be understood more readily by reference to the following detailed description, examples, drawings, and claims, and their previous and following description. However, it is to be understood that this invention is not limited to the specific compositions, systems, and/or methods disclosed unless otherwise specified, and as such, of course, can vary. While aspects of the present invention can be described and claimed in a particular statutory class, such as the composition of matter statutory class, this is for convenience only and one of skill in the art will understand that each aspect of the present invention can be described and claimed in any statutory class.

The following description of the invention is also provided as an enabling teaching of the invention in its best, currently known aspect. To this end, those of ordinary skill in the relevant art will recognize and appreciate that changes and modifications may be made to the various aspects of the invention described herein, while still obtaining the beneficial results of the present invention. It will also be apparent that some of the benefits of the present invention may be obtained by selecting some of the features of the present invention without utilizing other features. Accordingly, those of ordinary skill in the relevant art will recognize that many modifications and adaptations to the present invention are possible and may even be desirable in certain circumstances, and are thus also a part of the present invention.

While the present invention is capable of being embodied in various forms, the description below of several embodiments is made with the understanding that the present disclosure is to be considered as an exemplification of the invention, and is not intended to limit the invention to the specific embodiments illustrated. Headings are provided for convenience only and are not to be construed to limit the invention in any manner. Embodiments illustrated under any heading or in any portion of the disclosure may be combined with embodiments illustrated under the same or any other heading or other portion of the disclosure.

Any combination of the elements described herein in all possible variations thereof is encompassed by the invention unless otherwise indicated herein or otherwise clearly contradicted by context.

Unless otherwise expressly stated, it is in no way intended that any method or aspect set forth herein be construed as requiring that its steps be performed in a specific order. Accordingly, where a method claim does not specifically state in the claims or description that the steps are to be limited to a specific order, it is in no way intended that an order be inferred, in any respect. This holds for any possible non-express basis for interpretation, including matters of logic with respect to arrangement of steps or operational flow, plain meaning derived from grammatical organization or punctuation, or the number or type of embodiments described in the specification. It is to be understood that both the foregoing general description and the following detailed description are exemplary and explanatory only and are not restrictive.

All publications mentioned herein are incorporated herein by reference to disclose and describe the methods and/or materials in connection with which the publications are cited.

It is to be understood that the terminology used herein is for the purpose of describing particular aspects only and is not intended to be limiting. Unless defined otherwise, all technical and scientific terms used herein have the same meaning as commonly understood by one of ordinary skill in the art to which this invention belongs. In this specification and in the claims which follow, reference will be made to a number of terms which are defined herein.

As used in the specification and the appended claims, the singular forms "a," "an" and "the" include plural referents unless the context clearly dictates otherwise.

As used herein, the terms "optional" or "optionally" mean that the subsequently described event, condition, component, or circumstance may or may not occur, and that the description includes instances where said event, condition, component, or circumstance occurs and instances where it does not.

As used herein, the phrase "sufficient to" (e.g., "conditions sufficient to") refers to such a value or a condition that is capable of performing the function or property for which a sufficient value or condition is expressed. As will be pointed out below, the exact value or particular condition required may vary from one embodiment to another, depending on recognized variables, such as the materials employed and/or the processing conditions.

The term "by weight," when used in conjunction with a component, unless specifically stated to the contrary, is based on the total weight of the formulation or composition in which the component is included. For example, if a particular element or component in a composition or article is said to be present in an amount of 8% by weight, it is understood that this percentage is in relation to a total compositional percentage of 100%. In some instances, the weight percent of a component is based on the total weight of the composition "on a dry basis" or "based on solids," which indicates the weight of the composition without water (e.g., less than about 1%, less than about 0.5%, less than about 0.1%, less than about 0.05%, or about 0% of water by weight, based on the total weight of the composition).

When disclosing numerical values herein, for example, 1, 2, 3, 4, 5, 6, 7, 8, 9, 10, the following sentence typically follows such numerical values: "Each of the foregoing numbers can be preceded by the term 'about,' 'at least about,' or 'less than about,' and any of the foregoing numbers can be used singly to describe an open-ended range or in combination to describe a close-ended range." This sentence means that each of the aforementioned numbers can be used alone (e.g., 4), can be prefaced with the word "about" (e.g., about 8), prefaced with the phrase "at least about" (e.g., at least about 2), prefaced with the phrase "less than about" (e.g., less than about 7), or used in any combination with or without any of the prefatory words or phrases to define a range (e.g., 2 to 9, about 1 to 4, 8 to about 9, about 1 to about 10, and so on). Moreover, when a range is described as "about X or less," this phrase is the same as a range that is a combination of "about X" and "less than about X" in the alternative. For example, "about 10 or less" is the same as "about 10, or less than about 10." Such interchangeable range descriptions are contemplated herein. Other range formats are disclosed herein, but the difference in formats should not be construed to imply that there is a difference in substance.

The use of numerical values in the various quantitative values specified in this application, unless expressly indicated otherwise, may also be stated as approximations as though the minimum and maximum values within the stated ranges were both preceded by the word "about." In this manner, slight variations from a stated value may be used to achieve substantially the same results as the stated value. Also, the disclosure of ranges is intended as a continuous range including every value between the minimum and maximum values recited as well as any ranges that may be formed by such values. Also disclosed herein are any and all ratios (and ranges of any such ratios) that may be formed by dividing a recited numeric value into any other recited numeric value. Accordingly, the skilled person will appreciate that many such ratios, ranges, and ranges of ratios may be unambiguously derived from the numerical values presented herein and in all instances such ratios, ranges, and ranges of ratios represent various embodiments of the present invention.

As used herein, the term "substantially free of" refers to a composition having less than about 1% by weight, e.g., less than about 0.5% by weight, less than about 0.1% by weight, less than about 0.05% by weight, or less than about 0.01% by weight of the stated material, based on the total weight of the composition.

As used herein, the term "substantially," when used in reference to a composition, refers to at least about 60% by weight, e.g., at least about 65%, at least about 70%, at least about 75%, at least about 80%, at least about 85%, at least about 90%, at least about 91%, at least about 92%, at least about 93%, at least about 94%, at least about 95%, at least about 96%, at least about 97%, at least about 98%, at least about 99%, or about 100% by weight, based on the total weight of the composition, of a specified feature or component.

As used herein, the term "foam" means a light frothy mass of fine bubbles formed in or on the surface of a liquid or from a liquid. Herein, depending on context, the term can be referring to the wet foam prior to drying, or it can be used to describe the dry foam.

As used herein, "stable foam" (or the word "stable" referring to a foam) refers to a foam that is stable with respect to collapse during the drying process and beyond in the absence of any external force other than the surrounding atmosphere.

As used herein, "flexible foam" refers to a dried foam that can be readily compressed to less than 30% of its original height with minimal pressure, i.e. 15 psi or less.

As used herein, "ambient cure conditions" refers to the range of conditions typically experienced in unconditioned, outdoor spaces and under which an aerosol-dispensed foam product could be dispensed and dried. This excludes environments that include any form of forced convection and/or heating.

All molecular weights and other values associated with molecular weights disclosed herein are measured by Gel Permeation Chromatography (GPC).

As used herein, Gel Permeation Chromatography (GPC) refers to a type of size exclusion chromatographic separation method in which molecules in solution are separated by their size. The separation is achieved by the differential exclusion of the sample molecules as they pass through a bed of porous particles, known as a separation column. GPC may be used to determine a substantially accurate molar mass distribution of polymer molecules. For example, the liquid fraction (an eluent) passing through the column is collected in constant volumes. As the polymer elutes through the column, molecules that are too large to penetrate the column pores are excluded from the packing pore volume and elute at earlier retention times, whereas the smaller molecules penetrate into the column pores and elute at a later time. The concentration of eluted polymers may be measured by spectroscopic techniques, such as, for example, refractive index (RI) and ultraviolet (UV). The eluent flow may also be analyzed continuously with RI, Low-Angle Laser Light Scattering (LALLS), Multi-Angle Laser Light Scattering (MALLS), UV, and/or viscosity measurements.

As used herein, the term "number average molecular weight" ($M_n$, or $\overline{M}_n$) refers to the statistical average molecular weight of all the polymer chains in the sample and is defined by the formula:

$$M_n = \frac{\sum N_i M_i}{\sum N_i},$$

where $M_i$ is the molecular weight of a chain and $N_i$ is the number of chains of that molecular weight. $M_n$ may be determined for polymers, e.g., polycarbonate polymers, by methods well known to a person having ordinary skill in the art using molecular weight standards, e.g., polycarbonate standards or polystyrene standards, preferably certified or traceable molecular weight standards.

As used herein, the term "weight-average molecular weight" ($M_w$, or $\overline{M}_w$) is defined by the formula:

$$M_w = \frac{\sum N_i M_i^2}{\sum N_i M_i},$$

where $M_i$ is the molecular weight of a chain and $N_i$ is the number of chains of that molecular weight. Compared to $M_n$, $M_w$ takes into account the molecular weight of a given chain in determining contributions to the molecular weight-average. Thus, the greater the molecular weight of a given chain, the more the chain contributes to the $M_w$. $M_w$ may be determined for polymers, e.g., polycarbonate polymers, by methods well known to a person having ordinary skill in the art using molecular weight standards, e.g., polycarbonate standards, polystyrene, or poly(methyl methacrylate) standards, preferably certified or traceable molecular weight standards.

Herein, the term "polyol" refers to a molecule or polymer containing on average two or more hydroxyl groups per molecule (R'—(OH)n). The term "polyisocyanate" refers to a molecule or polymer containing on average two or more isocyanate groups per molecule (R—(N=C=O)n).

In some embodiments, the invention provides a foamable waterborne dispersion which forms a stable flexible foam under ambient cure conditions, said foamable waterborne dispersion comprising: a polyurethane polymer formed from one or more aliphatic or cycloaliphatic polyisocyanate and at least two different polymeric polyol components selected from (i) polyether polyol, (ii) polyester polyol, and (iii) polycarbonate polyol; wherein the two different polymeric polyol components include a polymeric polyol from at least two of the three polymeric polyol categories (i), (ii) and (iii); and wherein the ambient cure conditions include a temperature of from 4° C. to 32° C., and a humidity of 0% relative humidity to 90% relative humidity.

In some embodiments, the current invention relates to a composition comprising one or more waterborne polyurethane dispersion (PUD). Some waterborne polyurethane dispersions (PUDs) are commercially available from such suppliers as Dow Chemical Co., Midland, Mich., USA; C. L. Hauthaway and Sons, Corp., Lynn, Mass., USA; Lubrizol Advanced Materials, Inc., Brecksville, Ohio, USA; Covestro AG, Leverkusen, Germany; and Brenntag Specialties, Inc., South Plainfield, N.J., USA. However, many of the constituent components of the commercial PUDs are proprietary.

Methods to make generic waterborne polyurethane dispersions are generally known in the art. More commonly, the polyurethane polymer is prepared in bulk or in solution first, and then dispersed in water (or, alternatively, water is added into the dissolved polyurethane polymer solution) as described herein below.

Generally, polyurethanes are produced by reacting an isocyanate containing two or more isocyanate groups per molecule (R—(N═C═O)n) with a polyol containing on average two or more hydroxyl groups per molecule (R'—(OH)n), optionally in the presence of a catalyst or by activation with ultraviolet light. The polymerization reaction makes a polymer containing the urethane linkage, —RNHCOOR'—. The optional catalyst may include, for example, tertiary amines, such as 1,4-diazabicyclo-[2.2.2] octane (also called DABCO), or metallic compounds, such as dibutyltin dilaurate or bismuth octanoate. The reaction is normally performed to produce a polyurethane prepolymer and then chain extended by the addition of chain extenders (discussed below).

The polyurethane prepolymer is a reaction product of prepolymer reactants comprising, or consisting of, one or more polymeric polyol component, one or more polyisocyanate component, and, optionally, a chain extender molecule. The polymeric polyol component is one or more than one polymeric polyol and is characterized by having an average hydroxyl functionality of 1.8 or more, and typically in a range of 2.0 to 2.85. The average hydroxyl functionality for a polymeric polyol component can be measured according to ASTM D4274-11 (method D). The average hydroxyl functionality $\bar{f}$ for a polymeric polyol component comprising n different polyols for which nominal hydroxyl functionalities are known is represented by equation (1)

$$\bar{f} = \sum_{i=1}^{n} f_i \frac{w_i}{M_i} / \sum_{i=1}^{n} \frac{w_i}{M_i} \qquad (1)$$

where $f_i$ is the hydroxyl functionality of polyol i, $w_i$ is the weight fraction of polyol i and $M_i$ is the number average molecular weight of polyol i determined by gel permeation chromatography. The hydroxyl functionality of the polyols in the polymeric polyol component can be any value but should be selected such that the average hydroxyl functionality of the entire polymeric polyol component is in a desired range (for example, from 2.0 to 2.85). Desirably, the polymeric polyol component comprises or consists of a combination of diols (hydroxyl functionality of two) and triols (hydroxyl functionality of three).

In some embodiments, the polymeric polyol component consists of a blend of diols, wherein each diol has a number average molecular weight in a range of 500-3000 grams per mole, and, indeed, taken together, the polymeric polyol component may have an effective average molecular weight in a range of 500-3000 grams per mole. Effective average molecular weight is determined using equation (2):

$$\bar{M} = \sum_{i=1}^{n} w_i M_i / \sum_{i=1}^{n} w_i \qquad (2)$$

$M_i$ is number average molecular weight and $w_i$ is weight fraction of polyol i. The number average molecular weights referred to herein may be determined using gel permeation chromatography. Typically, the chain extender molecule is an oligomeric chain extender with a number average molecular weight in a range of 60 to 300 grams per mole and is present at a concentration of 0.5 to 5 weight-parts per 100 weight-parts total polyurethane dispersion (or 0.3 to 3 parts per 100 weight-parts total polyurethane solids).

Suitable polymeric polyol components for polyurethane synthesis include polyether polyols, polyester polyols, and polycarbonate polyols, as well as polycaprolactone polyols, polyacrylate polyols, polybutadiene polyols, and polysulfide polyols. These can be used individually or in any desired mixtures with one another. In some embodiments of the invention the polymeric polyol component is a mixture of at least two different polymeric polyol components selected from (i) polyether polyol ("polyol-A"), (ii) polyester polyol ("polyol-B"), and (iii) polycarbonate polyol ("polyol-C"); wherein the two different polymeric polyol components include a polymeric polyol from at least two of the three polymeric polyol categories (i), (ii) and (iii).

In some embodiments of the invention the at least two polymeric polyol components is a mixture comprising one or more polyether polyol(s) and one or more polyester polyol(s), or a mixture comprising one or more polyether polyol(s) and one or more polycarbonate polyol(s), or a mixture comprising one or more polyester polyol(s) and one or more polycarbonate polyol(s), or a mixture comprising polyether polyol(s), polyester polyol(s), and polycarbonate polyol(s).

Polyether polyols include those obtainable using conventional synthesis means by reacting epoxides (alkylene oxides such as those selected from a group consisting of ethylene oxide, propylene oxide and butylene oxide, or combinations thereof) with an initiator having two active hydrogen atoms (for a diol) or with an initiator having three active hydrogen atoms (for a triol) or initiators having more than three active hydrogen atoms (for polyols with more than three hydroxyl functional groups). Examples of suitable initiators include ethylene glycol, diethylene glycol, propylene glycol, dipropylene glycol, tripropylene glycol, 1,4-butanediol, 1,6-hexane diol; cycloaliphatic diols such as 1,4-cyclohexane diol, glycerol, trimethylol propane, ethylenediamine, triethanolamine, sucrose and aromatic based initiators or mixtures thereof. Desirable polyols are those obtainable using ethylene oxide, or propylene oxide, or a combination of ethylene oxide and propylene oxide (i.e. poly(ethylene oxide-propylene oxide)). Another commonly used polyether polyol is polytetramethylene glycol polyol. Once reacted, the polyether polyols are essentially free of monomeric alkylene oxide and initiators. "Essentially free" means containing less than one wt %, preferably 0.5 wt % or less, more preferably 0.1 wt % or less and can be 0.05 wt % or less and even 0.01 wt % or less or entirely free of the specified component based on total polymeric polyol component weight.

Polyester polyols include those obtainable from conventional synthesis means using polycarboxylic acids and polyfunctional alcohols such as those having from 2 to 12 carbon atoms. Examples of suitable polycarboxylic acids include glutaric acid, succinic acid, adipic acid, sebacic acid, phthalic acid, isophthalic acid, and teraphthalic acid. Examples of suitable polyfunctional alcohols that can be combined with any of these polycarboxylic acids include ethylene glycol, propanediol (including propylene glycol), butanediol, hexanediol and neopentyl glycol. For example, poly(neopentyl glycol adipate) can be synthesized using neopentyl glycol and adipic acid. Once reacted, the polyester polyols are essentially free of polycarboxylic acids and polyfunctional alcohols.

Polycarbonate polyols include those obtainable from the reaction of polyfunctional alcohols (for example, diols, including those disclosed above) with carbon acid derivatives, such as, for example, diphenyl carbonate, dimethyl carbonate, ethylene carbonate or phosgene. For example, polyhexamethylene carbonate can be synthesized by ester-exchanging polycondensation of ethylene carbonate (or dimethyl carbonate) and 1,6-hexanediol. Once reacted, the polycarbonate polyols are essentially free of the carbon acid derivatives and polyfunctional alcohols.

A discussed above, the polymeric polyol component of the invention is a mixture of one or more polyether polyol(s) and one or more polyester polyol(s) (polyol-A/polyol-B), or a mixture of one or more polyether polyol(s) and one or more polycarbonate polyol(s) (polyol-A/polyol-C), or a mixture of one or more polyester polyol(s) and one or more polycarbonate polyol(s) (polyol-B/polyol-C), or a mixture of polyether polyol(s), polyester polyol(s), and polycarbonate polyol(s) (polyol-A/polyol-B/polyol-C).

In certain embodiments, a weight ratio of polyol-A: polyol-B, or a weight ratio of polyol-A:polyol-C, or a weight ratio of polyol-B:polyol-C is 5:95, 10:90, 20:80, 25:75, 30:70, 40:60, 50:50, 60:40, 70:30, 75:25, 80:20, 90:10, or 95:5. Each of the foregoing ratios can be preceded by the word "about," "at least about," or "less than about," and any of the foregoing ratios can be used singly to describe an open-ended range or in combination to describe a close-ended range. For example, the weight ratio of any of A:B or A:C or B:A or B:C or C:A or C:B can be at least about 20:80, about 25:75 to about 75:25, about 35:65 to about 60:40, or less than about 90:10. In some embodiments, the weight ratio of polyether polyol to polyester polyol or polycarbonate polyol in the polyurethane polymer of the foamable waterborne dispersion is from 5:95 to 90:10, 10:90 to 90:10, or from 10:90 to 60:40, or from 10:90 to 50:50.

Generally, suitable polyisocyanates for the synthesis of polyurethanes include aliphatic, cycloaliphatic, arylaliphatic and aromatic polyisocyanates. Examples of suitable polyisocyanates include alkylene diisocyanates having from 4 to 12 carbon atoms in the alkylene moiety (such as, for example, 1,12 dodecane diisocyanate; 2-methylpentamethylene 1,5-diisocyanate; tetramethylene 1,4-diisocyanate; and hexamethylene 1,6-diisocyanate), cycloaliphatic diisocyanates (such as, for example, cyclohexane 1,3- and 1,4-diisocyanate; 5-isocyanato-1-(isocyanatomethyl)-1,3,3-trimethyl-cyclohexane (also known as isophorone diisocyanate, or IPDI); 2,4- and 2,6-hexahydrotoluene diisocyanate and the corresponding isomer mixtures; 4,4'-, 2,2'- and 2,4'-dicyclohexylmethane diisocyanate and the corresponding isomer mixtures) as well as aromatic diisocyanates and polyisocyanates (such as, for example, 2,4- and 2,6-toluene diisocyanate and the corresponding isomer mixtures thereof, 4,4'-, 2,4'- and 2,2'-diphenylmethane diisocyanates and the corresponding isomer mixtures thereof; polymethylene polyphenyl isocyanates (PMDI)). In some embodiments of the invention, the polyurethane polymer is formed from one or more aliphatic or cycloaliphatic polyisocyanate compounds. In some embodiments, the one or more aliphatic or cycloaliphatic polyisocyanate comprises isophorone diisocyanate. In some embodiments, the one or more aliphatic or cycloaliphatic polyisocyanate is isophorone diisocyanate. In some embodiments, the PUD of the present invention is free of toluene diisocyanate and reaction products of toluene diisocyanate in order to avoid concern with possible health issues associated with toluene diisocyanate. In some embodiments, the PUD of the present invention is free of aromatic polyisocyanate and reaction products of aromatic polyisocyanate in order to avoid concern with possible health issues associated with aromatic polyisocyanate.

In some embodiments, the PUD of the present invention is free of polymeric aromatic isocyanates and reaction products thereof.

The chain extender molecule can be a single type of molecule or a combination of different molecules. Desirably, the chain extender molecules are selected from a group consisting of molecules or oligomers having 2 to 4 functional groups selected from hydroxyl and amine moieties. In some embodiments, the chain extender can have only amine functional groups. In some embodiments, the chain extender can have from 2 to 4 amine groups, such as, for example, 1,2-ethylene diamine, 1,2- and 1,3-diaminopropane, 3-amino-1-methylamino-propane, 1,4-diaminobutane, 1,6-diaminohexane, isophoronediamine, diethylenetriamine, 4,4-diamino-dicyclohexylmethane, and the like. In some embodiments, the chain extender can comprise both hydroxyl and amine functional groups, such as, for example, ethanolamine, diethanolamine, 3-aminopropanol, and the like. In some embodiments, the chain extender can have only hydroxyl functional groups. In some embodiments, the chain extender can have from 2 to 4 hydroxyl groups. More desirably, the chain extenders are selected from a group consisting of ethylene glycol, 1,4-butanediol, 1,5-pentanediol, 1,6-hexanediol, cyclohexane dimethanol, hydroquinone bis(2-hydroxyethyl) ether, and glycerol. Chain extenders are low molecular weight species (typically less than 300 grams per mole as determined by gel permeation chromatography). As such, they are distinct from the higher molecular weight polymeric polyol component.

The chain extender molecules are present at a concentration of 0.5 weight-parts or more and can be present at a concentration of one weight-part or more, two weight-parts or more, three weight-parts or more and even four weight-parts or more while at the same time are typically present at a concentration of five weight-parts or less and can be present at a concentration of four weight-parts or less, three weight-parts or less and even two weight-parts or less, with weight-parts based on 100 weight parts of polymeric polyol component.

PUDs are synthesized in a two-step process; the first stage involves reacting the polyol and isocyanate for 2-8 hours at 50-70° C. and at ambient pressure to form a prepolymer. The prepolymer is typically kept hot and is then dispersed into stirring water; the water is kept between 10-30° C.

One method known in the art for manufacturing a waterborne PUD is to make an isocyanate-terminated prepolymer and to incorporate carboxylic acid or carboxylate functionality in the backbone by using a modifying polyol (or any other compound having at least one isocyanate-reactive functional group) having carboxylic acid or carboxylate functionality. Similarly, incorporation of sulfonic acid or sulfonate functionality, or phosphoric acid or phosphonate functionality can also be used. For example, mono- and dihydroxy carboxylic acids or carboxylates, mono- and dihydroxy sulfonic acids or sulfonates, or mono- and dihydroxy phosphonic acids or phosphonates may be suitable. Alternatively, mono- and diaminocarboxylic acids or carboxylates, mono- and diaminosulfonic acids or sulfonates, or mono- and diaminophosphonic acids or phosphonates may also be suitable. The urethane polymer (or prepolymer) can then be dispersed into water with, for example, a tertiary amine to produce ionic centers thus stabilizing the polymer particle. As known in the art, polymer particles may also be stabilized in water using non-ionic species, such as, for example, polyoxyalkylene ethers. Accordingly, the polyurethane backbone may be modified by addition of, for example, monohydroxy-functional polyalkylene oxide polyether alcohols. Polymer stabilization in water taking advantage of both ionic stabilization (via the carboxylates, sulfonates and/or phosphonates) and non-ionic stabilization (using the polyoxyalkylene ethers) may also be suitable. Chain extension (described above) may (although not typically) precede dispersion, in which case the chain-extended polyurethane polymer is either introduced into the dispersion water with a high level of shear (for example, vigorous stirring), or the inverse method is used, by stirring the dispersion water into the chain-extended polyurethane polymer solution. Generally, it is preferable to add the water to the dissolved chain-extended polyurethane polymer. Residual solvent can be stripped off by distillation or related techniques. More typically (or additionally), the chain extension can be performed after dispersion into water, in which case the stabilized prepolymer is then extended with a polyhydroxy compound or polyamine or hydroxyl amine (or combination thereof) as described above.

The solids content of the waterborne polyurethane dispersion is not particularly limited, with solids contents typically from 35% to 70% solids or more, more preferably 40% to 70% solids, or 45% to 65% solids. However, the solids content of the foamable waterborne polyurethane composition may be more sensitive to issues of storage, containment and ease of dispensing, especially with respect to dispensing from a pressurized container, such as an aerosol can, with a propellant to produce a wet foamed material prior to drying. In such cases, a desirable solids range may be from 35% to 60% solids in the waterborne dispersion.

The foamable waterborne polyurethane dispersion may be minimally formulated to produce a foamable waterborne polyurethane dispersion composition in order to facilitate production of a fine wet foam and optionally provide enhanced properties for specialized applications. For example, for dispensing from a pressurized container such as an aerosol can, the formulation may include one or more propellant, for example, liquefiable blowing gases as known in the art, such as, propane, butane, isobutane, pentane, hexane, dimethyl ether, diethyl ether, acetone, methyl ethyl ketone, 1,1,1,2-tetrafluoroethane and 1,2-difluoroethane, which may be used alone or in combination. Other supplemental gases, such as carbon dioxide, nitrogen, argon, etc. may also be used. The blowing gas content may be from 3-25%, or more commonly 3-10%, by weight of the total weight of the foamable waterborne polyurethane dispersion composition. Other optional additives as known in the art include, but are not limited to, thickeners, surfactants, flame retardants, anti-freeze agents, anti-corrosion agents, co-solvents, colorants, fillers, biocides, fungicides, algicides, etc. Such additives may make up 10-30% of the total foamable waterborne polyurethane dispersion. In some embodiments, the foamable waterborne dispersion comprises up to 10%, by weight in relation to the entire foamable waterborne dispersion, of ionic surfactants, soaps, or waxes. In some embodiments, the foamable waterborne dispersion comprises less than 0.3%, by weight in relation to the entire foamable waterborne dispersion, of ionic surfactants, soaps, or waxes. In some embodiments, the foamable waterborne dispersion is free of ionic surfactants, soaps, or waxes.

In certain embodiments, the formulated product comprising the foamable waterborne polyurethane dispersion described herein can exhibit a pH of 5, 6, 7, 7.5, 8, 8.2, 8.4, 8.6, 8.8, 9, 9.2, 9.4, 9.6, 9.8, 10, 10.2, 10.4, 10.6, 10.8, 11, 11.2, 11.4, 11.6, 11.8, 12, or 12.5. Each of the foregoing numbers can be preceded by the word "about," "at least about," or "less than about," and any of the foregoing numbers can be used singly to describe an open-ended range or in combination to describe a close-ended range. For example, in some embodiments, the pH can be at least about 7, about 8.0 to about 12.0, or about 9.0 to about 11.5, or about 9.5 to about 11.0, or less than about 12.0. Test methods in accordance with USP <791> may be used for pH determinations, hereby incorporated by reference in its entirety.

In some embodiments, the formulated product comprising the foamable waterborne polyurethane dispersion described herein can have a viscosity (cP or mPa·s), at about 23° C. when measured at 30 rpm using Brookfield RV spindle no. 3, of 100, 200, 300, 400, 500, 600, 700, 800, 900, 1000, 1100, 1200, 1300, 1400, 1500, 1600, 1700, 1800, 1900, 2000, 2100, 2200, 2300, 2400, 2500, 2800, 3000, 3500, or 4000. Each of the foregoing numbers can be preceded by the word "about," "at least about," or "less than about," and any of the foregoing numbers can be used singly to describe an open-ended range or in combination to describe a close-ended range. For example, in some embodiments, the viscosity (cP or mPa·s), at about 23° C. when measured at 30 rpm using Brookfield RV spindle no. 3, can be at least about 100, about 200 to about 2,000, or about 250 to about 1,800, or about 300 to about 1,500, or about 500 to about 1,200, or less than about 3,000.

In certain embodiments, the invention described herein relates to the production of foamable waterborne dispersions. Advantageously, these foamable waterborne dispersions produce stable foams that are not subject to collapse even when dispensed and dried under conditions of high temperature and high relative humidity, such as, for example, 32° C. and 90% relative humidity. For example, the wet foam may dry without collapse, and only minimal shrinkage, to yield a dry flexible foam wherein the height of the foam is greater than 3 mm, or greater than 5 mm, or even greater than 3 cm.

In some embodiments, there is provided methods of providing a space filling layer or space filling volume adjacent to or on a surface comprising, consisting of, or consisting essentially of applying to said surface a foamed sample of the foamable waterborne dispersion of the invention; and allowing the foamed sample of foamable waterborne dispersion to dry under ambient conditions to yield a stable flexible foam; wherein the ambient cure conditions include a temperature of from 4° C. to 32° C., and a humidity of 0% relative humidity to 90% relative humidity. For example, disclosed herein is a method of providing a space filling layer or space filling volume adjacent to or on a surface, the method comprising, consisting of, or consisting essentially of: (a) providing a foamable waterborne dispersion comprising a polyurethane polymer formed from one or more aliphatic or cycloaliphatic polyisocyanate and at least two different polymeric polyol components selected from (i) polyether polyol, (ii) polyester polyol, and (iii) polycarbonate polyol; wherein the two different polymeric polyol components include a polymeric polyol from at least two of the three polymeric polyol categories (i), (ii) and (iii); (b) applying a foamed sample of the foamable waterborne dispersion to said surface; and (c) allowing the foamed sample of foamable waterborne dispersion to dry under ambient conditions to yield a stable flexible foam; wherein the ambient cure conditions include a temperature of from 4° C. to 32° C., and a humidity of 0% relative humidity to 90% relative humidity. In some embodiments, the method provides a space filling layer or space filling volume adjacent to or on a surface when the foamable waterborne dispersion is dried at 32° C. and 90% relative humidity. In some embodiments, the step of applying the foamed sample of the foamable waterborne dispersion is performed by dispensing the foamable waterborne dispersion from a pressurized container, such as a pressurized aerosol container.

In some embodiments, there is provided flexible foams produced from the foamable waterborne dispersions of the invention. In some embodiments, the foam is dispensed from a pressurized container, preferably a pressurized aerosol container, and dried to form the flexible foam. The properties of the foams can be tuned to some extent according to the desired use. For example, the dry flexible foam may have a density of from 0.04 to 0.4 g/cm$^3$, and preferably from 0.06 to 0.2 g/cm$^3$. The flexible foams may be used in multiple fields and applications, for example, and without limitation, packaging, building and construction materials, and many more. In building and construction, the flexible foams may be used to fill space between two surfaces, or portions of two surfaces, to block air transmission through gaps in the building envelope, or to provide thermal and/or acoustic insulation, or to prevent unwanted movement of the surfaces, or to prevent abrasive wear or rattling due to movement of the surfaces. The foams also find use as caulks, sealants or gaskets. For example, the foamable waterborne dispersion may form a stable flexible foam, such as a bead or layer of foam, on a surface under ambient conditions, which may be dried prior to being compressed by a second surface, and thereby act as a gasket.

Some embodiments disclosed herein are set forth in the following clauses, and any combination of any number of these clauses (or portions thereof) may be made to define an embodiment. For example, if a composition described in an embodiment may vary according to an additional feature or claim element, it is to be understood that other compositions described in other embodiments may also vary according to that same additional feature or claim element. Furthermore, methods described herein that utilize a composition may also vary by way of such compositional variations.

Clause 1: A foamable waterborne dispersion which forms a stable flexible foam under ambient cure conditions, said foamable waterborne dispersion comprising:
a polyurethane polymer formed from one or more aliphatic or cycloaliphatic polyisocyanate and at least two different polymeric polyol components selected from (i) polyether polyol, (ii) polyester polyol, and (iii) polycarbonate polyol; wherein the two different polymeric polyol components include a polymeric polyol from at least two of the three polymeric polyol categories (i), (ii) and (iii); and wherein the ambient cure conditions include a temperature of from 4° C. to 32° C., and a humidity of 0% relative humidity to 90% relative humidity; and particularly a temperature of 32° C. and a humidity of 90% relative humidity.

Clause 1a: The foamable waterborne dispersion of clause 1, wherein the polyurethane polymer is formed from one or more aliphatic or monocyclic cycloaliphatic polyisocyanate and the at least two different polymeric polyol components.

Clause 2: The foamable waterborne dispersion of clause 1 or 1a, wherein the at least two different polymeric polyol components comprise one or more polyether polyol and one or more polyester polyol.

Clause 3: The foamable waterborne dispersion of clause 1 or 1a, wherein the at least two different polymeric polyol components comprise one or more polyether polyol and one or more polycarbonate polyol.

Clause 4: The foamable waterborne dispersion of any one of the previous clauses, wherein the weight ratio of polyether polyol to polyester polyol or polycarbonate polyol is from 5:95 to 90:10; or from 10:90 to 90:10; or from 10:90 to 60:40; or from 10:90 to 50:50.

Clause 5: The foamable waterborne dispersion of any one of the previous clauses, wherein the one or more aliphatic or cycloaliphatic polyisocyanate is or comprises isophorone diisocyanate. In some embodiments, the foamable waterborne dispersion is free of aromatic polyisocyanate and reaction products of aromatic polyisocyanate. In some embodiments, the foamable waterborne dispersion is free of toluene diisocyanate and reaction products of toluene diisocyanate.

Clause 6: The foamable waterborne dispersion of any one of the previous clauses, wherein the stable flexible foam has a density of from 0.04 to 0.4 g/cm$^3$, and preferably from 0.06 to 0.2 g/cm$^3$.

Clause 7: The foamable waterborne dispersion of any one of the previous clauses, wherein the dispersion comprises less than 0.3%, by weight in relation to the entire foamable waterborne dispersion, of ionic surfactants, soaps, or waxes. In an embodiment, the foamable waterborne dispersion of any one of clauses 1-6 is free of ionic surfactants, soaps, or waxes.

Clause 7a: The foamable waterborne dispersion of any one of the previous clauses, wherein the polyurethane polymer makes up from 50% to 98%, or from 50% to 95%, or from 50% to 90%, or from 50% to 85%, by weight of solids based on the total solids of the foamable waterborne dispersion.

Clause 7b: The foamable waterborne dispersion of any one of the previous clauses, wherein a stable flexible foam is formed under curing conditions of 32° C. and 90% relative humidity.

Clause 8: The stable flexible foam produced from the foamable waterborne dispersion of any one of the previous clauses. In an embodiment, the stable flexible foam is compressed between two surfaces and acts as a gasket.

Clause 8a: The stable flexible foam of clause 8, wherein the polyurethane polymer makes up from 50% to 99%, 50% to 98%, or from 50% to 95%, or from 50% to 90%, or from 50% to 85%, by weight of solids based on the total solids of the stable flexible foam.

Clause 9: The stable flexible foam of clause 8 or 8a having a density of from 0.04 to 0.4 g/cm$^3$, and preferably from 0.06 to 0.2 g/cm$^3$.

Clause 10: The stable flexible foam of clause 8 or 9, wherein the foamable waterborne dispersion is dispensed from a pressurized container, preferably a pressurized aerosol container.

Clause 11: The stable flexible foam of any one of clauses 8-10, wherein the height of the foam is greater than 3 mm; or greater than 5 mm.

Clause 12: The method of providing a space filling layer or space filling volume adjacent to or on a surface comprising:
(a) applying to said surface a foamed sample of the foamable waterborne dispersion of any one of clauses 1-7; and
(b) allowing the foamed sample of foamable waterborne dispersion to dry under ambient conditions to yield a stable flexible foam;
wherein the ambient cure conditions include a temperature of from 4° C. to 32° C., and a humidity of 0% relative humidity to 90% relative humidity; and particularly a temperature of 32° C. and a humidity of 90% relative humidity. In an embodiment, the stable flexible foam is compressed between two surfaces and acts as a gasket.

Clause 13: The method of clause 12, wherein the step of applying the foamed sample of the foamable waterborne dispersion is performed by dispensing the foamable waterborne dispersion from a pressurized container, such as a pressurized aerosol container.

Clause 14: The method of clause 12, wherein the foamed sample of the foamable waterborne dispersion provides a stable space filling layer or space filling volume adjacent to or on a surface when cured at 32° C. and 90% relative humidity. In an embodiment, the stable flexible foam is compressed between two surfaces and acts as a gasket.

Clause 14a: The method of clause 12, wherein the weight ratio of polyether polyol to polyester polyol or polycarbonate polyol is from 5:95 to 90:10; or from 10:90 to 90:10; or from 10:90 to 60:40; or from 10:90 to 50:50.

Clause 15: The stable flexible foam produced by the method of any one of clauses 12-14 and 14a. In some embodiments, the stable flexible foam is compressed between two surfaces and acts as a gasket.

Clause 15a: The stable flexible foam produced by the method of any one of clauses 12-14 and 14a, wherein the polyurethane polymer makes up from 50% to 99%, 50% to 98%, or from 50% to 95%, or from 50% to 90%, or from 50% to 85%, by weight of solids based on the total solids of the stable flexible foam.

Clause 16: The stable flexible foam of clause 15 or 15a having a density of from 0.04 to 0.4 g/cm$^3$, and preferably from 0.06 to 0.2 g/cm$^3$.

Clause 17: The stable flexible foam of clause 15, 15a or 16, wherein the height of the foam is greater than 3 mm; or greater than 5 mm.

Clause 18: A method of providing a space filling layer or space filling volume adjacent to or on a surface, the method comprising:
(a) providing a foamable waterborne dispersion comprising a polyurethane polymer formed from one or more aliphatic or cycloaliphatic polyisocyanate and at least two different polymeric polyol components selected from (i) polyether polyol, (ii) polyester polyol, and (iii) polycarbonate polyol; wherein the two different polymeric polyol components include a polymeric polyol from at least two of the three polymeric polyol categories (i), (ii) and (iii);
(b) applying a foamed sample of the foamable waterborne dispersion to said surface; and
(c) allowing the foamed sample of foamable waterborne dispersion to dry under ambient conditions to yield a stable flexible foam;
wherein the ambient cure conditions include a temperature of from 4° C. to 32° C., and a humidity of 0% relative humidity to 90% relative humidity; and particularly a temperature of 32° C. and a humidity of 90% relative humidity. In an embodiment, the stable flexible foam is compressed between two surfaces and acts as a gasket.

Clause 19: The method of clause 18, wherein the step of applying the foamed sample of the foamable waterborne dispersion is performed by dispensing the foamable waterborne dispersion from a pressurized container, such as a pressurized aerosol container.

Clause 20: The method of clause 18, wherein the foamed sample of the foamable waterborne dispersion provides a stable space filling layer or space filling volume adjacent to or on a surface when cured at 32° C. and 90% relative humidity. In an embodiment, the stable flexible foam is compressed between two surfaces and acts as a gasket.

Clause 20a: The method of clause 18, wherein the weight ratio of polyether polyol to polyester polyol or polycarbonate polyol is from 5:95 to 90:10; or from 10:90 to 90:10; or from 10:90 to 60:40; or from 10:90 to 50:50.

Clause 21: The stable flexible foam produced by the method of any one of clauses 18-20 and 20a. In an embodiment, the stable flexible foam is compressed between two surfaces and acts as a gasket.

Clause 21a: The stable flexible foam produced by the method of any one of clauses 18-20 and 20a, wherein the polyurethane polymer makes up from 50% to 99%, 50% to 98%, or from 50% to 95%, or from 50% to 90%, or from 50% to 85%, by weight of solids based on the total solids of the stable flexible foam.

Clause 22: The stable flexible foam of clause 21 or 21a having a density of from 0.04 to 0.4 g/cm$^3$, and preferably from 0.06 to 0.2 g/cm$^3$.

Clause 23: The stable flexible foam of clause 21, 21a or 22, wherein the height of the foam is greater than 3 mm; or greater than 5 mm.

The present invention is further defined in the following Examples, in which all parts and percentages are by weight, unless otherwise stated. It should be understood that these examples, while indicating preferred embodiments of the invention, are given by way of illustration only and are not to be construed as limiting in any manner. From the above discussion and these examples, one skilled in the art can ascertain the essential characteristics of this invention, and without departing from the spirit and scope thereof, can make various changes and modifications of the invention to adapt it to various usages and conditions.

EXAMPLES

Example 1

In the examples that follow, waterborne polyurethane dispersions (PUDs) are minimally formulated and then foamed. The PUDs were prepared according to standard procedures known in the art (described above), and using the polyol/polyol blend and the isocyanate shown in Table 2.

The PUDs were prepared in a two-step process, the first step forming a neat polyurethane (PU) prepolymer where the reaction was allowed to proceed until % —NCO measurements indicated the reaction had gone to completion; and in a second step, the prepolymer was dispersed in water with cooling (5-10° C.) and high shear mixing. Chain extension was performed using 1,3-propylene diamine (1,3-PDA) at 10-15° C.

Example 2

The PUDs were formulated into a final foamable product according to the following formulation (Table 1):

TABLE 1

| Component | Parts |
| --- | --- |
| Polyurethane dispersion (40-50%) | 90 |
| Denatured ethanol | 4 |
| Water | 10 |
| Tergitol ® 15-S-40 (70%) [1] | 4 |
| Stanfax ® 320 (36%) [2] | 4 |
| Acrysol ® DR-72 (30%) [3] | 0.7 |
| Aerosol Propellant [4] | 6 |

[1] Tergitol ® 15-S-40 is a secondary alcohol ethoxylate, nonionic surfactant (Dow Chemical Co Midland, MI, USA).
[2] Stanfax ® 320 is ammonium stearate (Royal Coatings and Specialty Polymers-Para-Chem, South Bend, IN, USA).
[3] Acrysol ® DR-72 is an anionic associative thickener (Dow Chemical Co , Midland, MI, USA).
[4] Aerosol Propellant consisting of propane, isobutane and dimethyl ether.

The polyurethane dispersions were formulated as shown in Table 1 and then foamed by dispensing from an aerosol can using an aerosol propellant.

Example 3

In this example, the performance and potential utility of the dried foams were qualitatively assessed using a 1-5 scale (1=poor performance; 5=excellent performance) for the following properties:

Bead appearance after drying at room temperature and humidity (23° C. and 50% relative humidity). A score of 1 represents total collapse of the foam bead; a score of 5 represents no shrinkage or wrinkling of the foam bead.

Bead appearance after drying at high temperature and high humidity (32° C. and 90% relative humidity). A score of 1 represents total collapse of the foam bead; a score of 5 represents no shrinkage or wrinkling of the foam bead.

Bead rebound after momentary compression of the foam bead (to 30% of initial thickness) after drying at room temperature and humidity (23° C. and 50% relative humidity). A score of 1 represents no bounce back of the foam bead; a score of 5 represents complete and immediate bounce back of the foam bead.

Bead toughness after drying at room temperature and humidity (23° C. and 50% relative humidity). A score of 1 indicates the dried foam is friable and easily broken up; a score of 5 indicates excellent foam toughness.

The PUDs were formulated to produce foamable waterborne dispersions which were foamed by dispensing from an aerosol can using an aerosol propellant. The results for the foam beads are shown in Table 2, below.

TABLE 2

| PUD[1] | Polyol Type | Polyol Ratio | Polyisocyanate Type | Bead Appearance (23° C.; 50%) | Bead Appearance (32° C.; 90%) | Bead Rebound | Bead Toughness |
|---|---|---|---|---|---|---|---|
| 1 | Polyether / Polycarbonate | 50:50 | IPDI | 5 | 4 | 5 | 4 |
| 2 | Polyether / Polyester | 50:50 | IPDI | 5 | 3 | 5 | 5 |
| 3 | Polyether / Polyester | 25:75 | IPDI | 5 | 3 | 5 | 5 |
| 4 | Polyether / Polyester | 10:90 | IPDI | 5 | 3 | 5 | 5 |
| 5 | Polyether / Polyester | 75:25 | IPDI | 4 | 2 | 5 | 5 |
| 6 | Polyether / Polyester | 90:10 | IPDI | 5 | 3 | 5 | 5 |
| 7 | Polyether | | IPDI | 3 | 1 | 3 | 5 |
| 8 | Polyether | | MDI | 4 | 3 | 1 | 2 |
| 9 | Polyether | | IPDI | 4 | 2 | 1 | 2 |
| 10 | Polyether | | IPDI | 4 | 2 | 4 | 5 |
| 11 | Polyether | | IPDI | 2 | 1 | 2 | 5 |
| 12 | Polyester | | IPDI | 2 | 1 | 3 | 4 |
| 13 | Polycarbonate | | IPDI | 4 | 2 | 4 | 3 |
| 14 | Polycarbonate | | IPDI | 1 | 1 | 1 | 4 |
| 15 | Polyether / Polyester | 50:50 | H12-MDI | 2 | 1 | 3 | 4 |

1. PUD 1 is a commercially available PUD, Hauthane L-3696, available from C.L. Hauthaway & Sons Corp., Lynn, MA, USA. PUD 2-15 are made similarly and are formulated identically.

Satisfactory performance requires at least a rating of 3 for all categories (a rating of 1 or 2 in any one category equates to an unsatisfactory product candidate). It can be seen that nearly all of the single-component polyol PUDs (polyether polyol PUD, polyester polyol PUD or polycarbonate polyol PUD) perform poorly with respect to shrinkage or collapse after foam bead drying at high temperature and high humidity. The one single-component PUD sample (sample 8) that managed satisfactory performance in this category ranked very poorly for bead rebound performance, and also displayed poor toughness. Only the mixed polyol PUDs (polyether polyol/polyester polyol PUD, or polyether polyol/polycarbonate polyol PUD) showed acceptable (or excellent) performance across the full range of properties. The inventive foams have very good/excellent bead rebound and bead toughness in addition to bead stability with respect to collapse over a range of temperature and humidity conditions.

When ranges are used herein for physical properties, such as temperature ranges and pressure ranges, or chemical properties, such as chemical formulae, all combinations, and sub-combinations of ranges specific embodiments therein are intended to be included.

The disclosures of each patent, patent application, and publication cited or described in this document are hereby incorporated herein by reference, in their entirety.

Those skilled in the art will appreciate that numerous changes and modifications may be made to the preferred embodiments of the invention and that such changes and modifications may be made without departing from the spirit of the invention. It is, therefore, intended that the appended claims cover all such equivalent variations as fall within the true spirit and scope of the invention.

What is claimed:

1. A method of providing a space filling volume adjacent to or on a surface in a gap in a building envelope, the method comprising:
    (a) applying to said surface a foamed sample of a foamable waterborne dispersion, wherein said foamable waterborne dispersion comprises:
        a polyurethane polymer formed from isophorone diisocyanate, and
        at least two different polyol components that comprise one or more polyether polyol and one or more polyester polyol; and
    (b) allowing the foamed sample of foamable waterborne dispersion to dry under ambient conditions of 4° C. to 32° C. and 0% to 90% relative humidity to yield a stable foam;
    and
    wherein the stable foam provides a space filling volume adjacent to or on the surface in the gap in a building envelope to block air transmission,
    wherein the stable foam will not collapse at conditions of 32° C. and 90% relative humidity, and can be compressed to less than 30% of its original height with a pressure of 15 psi or less.

2. The method of claim 1, wherein the step of applying the foamed sample of the foamable waterborne dispersion is performed by dispensing the foamable waterborne dispersion from a pressurized container.

3. The method of claim 1, wherein the stable foam produced has a density of from 0.04 to 0.4 g/cm$^3$.

4. The method of claim 3, wherein the height of the stable foam is greater than 3 mm.

5. The method of claim 1, wherein the stable foam is compressed between two surfaces and acts as a gasket.

6. The method of claim 1, wherein the foamable waterborne dispersion comprises less than 0.3%, by weight in relation to the entire foamable waterborne dispersion, of ionic surfactants, soaps, or waxes.

7. The method of claim 1, wherein the weight ratio of polyether polyol to polyester polyol is from 5:95 to 90:10.

* * * * *